(12) United States Patent
Bray

(10) Patent No.: US 11,068,487 B2
(45) Date of Patent: Jul. 20, 2021

(54) EVENT-STREAM SEARCHING USING COMPILED RULE PATTERNS

(71) Applicant: Amazon Technologies, Inc., Seattle, WA (US)

(72) Inventor: Timothy William Bray, Vancouver (CA)

(73) Assignee: Amazon Technologies, Inc., Seattle, WA (US)

( * ) Notice: Subject to any disclaimer, the term of this patent is extended or adjusted under 35 U.S.C. 154(b) by 766 days.

(21) Appl. No.: 14/847,962

(22) Filed: Sep. 8, 2015

(65) Prior Publication Data

US 2017/0068706 A1 Mar. 9, 2017

(51) Int. Cl.
*G06F 16/2455* (2019.01)

(52) U.S. Cl.
CPC .............. *G06F 16/24564* (2019.01)

(58) Field of Classification Search
CPC .......... G06F 9/5072; G06F 17/289; G06F 17/30982; G06F 16/83; G06F 3/00; G06F 11/30; G06F 3/0484; G06F 16/8358; G06F 16/24564
See application file for complete search history.

(56) References Cited

U.S. PATENT DOCUMENTS

| | | | |
|---|---|---|---|
| 4,766,604 A | 8/1988 | Axberg | |
| 6,088,717 A | 7/2000 | Reed et al. | |
| 6,418,202 B1 | 7/2002 | Caldwell et al. | |
| 7,664,867 B2 | 2/2010 | Lockhart, Jr. | |
| 7,747,558 B2 | 6/2010 | Martinez Smith et al. | |
| 7,886,001 B2 | 2/2011 | Asthana et al. | |
| 7,962,633 B1 | 6/2011 | Sidebottom et al. | |
| 7,991,778 B2 | 8/2011 | Hull et al. | |
| 8,060,546 B2 | 11/2011 | Law et al. | |

(Continued)

FOREIGN PATENT DOCUMENTS

EP 1355232 10/2003

OTHER PUBLICATIONS

International Search Report and Written Opinion from PCT/US2016/050792, dated Dec. 8, 2016, Amazon Technologies, Inc., pp. 1-10.

(Continued)

*Primary Examiner* — Mariela Reyes
*Assistant Examiner* — Courtney Harmon
(74) *Attorney, Agent, or Firm* — Robert C. Kowert; Kowert, Hood, Munyon, Rankin & Goetzel, P.C.

(57) ABSTRACT

Methods, systems, and computer-readable media for implementing event-stream searching using compiled rule patterns are disclosed. A rule base is compiled based at least in part on one or more rule patterns. The field names are sorted within the rule patterns. The rule patterns comprise one or more field names and one or more field values. The rule base represents a finite-state machine comprising a plurality of states. A plurality of events are received. The events comprise field names and field values describing events associated with resources in a provider network. The field names are sorted within the events. The rule patterns are evaluated against the events using the rule base. In determining a matched rule pattern for one of the events, the finite-state machine transitions between at least two of the states for the matched rule pattern.

19 Claims, 8 Drawing Sheets

(56) References Cited

U.S. PATENT DOCUMENTS

| | | |
|---|---|---|
| 8,086,560 B2 | 12/2011 | Hernandez-Sherrington et al. |
| 8,239,426 B2 | 8/2012 | Rangadass et al. |
| 8,281,408 B2 | 10/2012 | Corndorf |
| 8,291,453 B2 | 10/2012 | Boortz |
| 8,484,185 B2 | 7/2013 | Fra' et al. |
| 8,577,927 B2 | 11/2013 | Fabret et al. |
| 8,665,911 B2 | 3/2014 | Law et al. |
| 8,719,605 B2 | 5/2014 | Chakra et al. |
| 8,775,457 B2 | 7/2014 | Schneider |
| 8,782,184 B2 | 7/2014 | Furlong et al. |
| 9,059,899 B2 | 6/2015 | Natarajan et al. |
| 2005/0114487 A1 | 5/2005 | Peng et al. |
| 2006/0190591 A1 | 8/2006 | Bobde et al. |
| 2007/0180043 A1 | 8/2007 | Vernal et al. |
| 2007/0208870 A1 | 9/2007 | Lockhart, Jr. |
| 2008/0109884 A1 | 5/2008 | Kulkarni et al. |
| 2008/0256124 A1 | 10/2008 | Hernandez-Sherrington et al. |
| 2009/0177669 A1* | 7/2009 | Ramarao ............ G06F 17/2247 |
| 2009/0177727 A1* | 7/2009 | Radia ............ G06F 9/5044 |
| | | 709/201 |
| 2010/0037088 A1 | 2/2010 | Krivopaltsev et al. |
| 2010/0100518 A1* | 4/2010 | Andrade ............ G06N 5/025 |
| | | 706/47 |
| 2011/0145301 A1 | 6/2011 | Fabret et al. |
| 2011/0258638 A1 | 10/2011 | Davies et al. |
| 2011/0296185 A1 | 12/2011 | Kamarthy et al. |
| 2013/0041958 A1* | 2/2013 | Post ............ G06Q 10/107 |
| | | 709/206 |
| 2013/0239126 A1 | 9/2013 | Sun |
| 2013/0275164 A1* | 10/2013 | Gruber ............ G10L 17/22 |
| | | 705/5 |
| 2014/0074826 A1* | 3/2014 | Cooper ............ G06F 17/30672 |
| | | 707/722 |
| 2014/0278590 A1* | 9/2014 | Abbassi ............ G06Q 30/0283 |
| | | 705/5 |
| 2014/0289391 A1 | 9/2014 | Balaji et al. |
| 2016/0019464 A1* | 1/2016 | Madhavan ............ G06F 16/972 |
| | | 706/11 |
| 2017/0193017 A1 | 7/2017 | Migliori |

OTHER PUBLICATIONS

U.S. Appl. No. 14/529,096, filed Oct. 30, 2014, Mihir Rajendrabhai Patel et al.

U.S. Appl. No. 14/529,097, filed Oct. 30, 2014, Mihir Rajendrabhai Patel, et al.

Brad Chacos, "How to Use IFTTT to Automate your Online Life", Jul. 18, 2013, pp. 1-11.

Office Action from European Application No. 16 779 207.6-1221, dated Dec. 16, 2019, Amazon Technologies, Inc., pp. 1-6.

Wikipedia, "Sorting algorithm", Retrieved from https://en.wikipedia.org/w.index.php?title=Sorting_algorithm&oldid=628674620#frb-inline, dated Oct. 7, 2014, pp. 1-11.

Office Action from European Application No. 16779207.6-1203, dated Feb. 2, 2021, pp. 1-8.

* cited by examiner

EVENT-STREAM SEARCHING USING COMPILED RULE PATTERNS

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to web servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. When customers access such facilities remotely, the facilities may be said to reside "in the cloud" and may represent cloud computing resources.

As the scale and scope of distributed systems have increased, the tasks of provisioning, administering, and managing the resources have become increasingly complicated. For example, maintenance is often necessary when problems arise with various components of distributed systems. System administrators have often performed such maintenance tasks in a manual and ad hoc manner. When maintenance tasks are performed manually, the results may be unnecessarily expensive and prone to error. Additionally, system administrators may be required to develop and deploy custom systems for performing maintenance tasks.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods and systems for event-stream searching using compiled rule patterns are described. Using the techniques described herein, rules may be defined to include rule patterns and actions. A rule pattern may define conditions for which one or more action should be performed. A rule pattern may include one or more field names (potentially including components nested in a hierarchical structure) and one or more field values. In one embodiment, rule patterns are flattened to remove a hierarchical structure, the field names within the rule patterns are sorted, and the rule patterns are compiled into a rule base that represents a finite-state machine. In the finite-state machine, transitions between states may represent matches of field names and/or matches of field values. A stream of events may represent resource changes in a provider network. In one embodiment, the events are flattened to remove a hierarchical structure, and the field names within events are sorted. The rule patterns may be evaluated against the events using the compiled rule base. In evaluating the rule patterns against an event, field names in the event that do not match field names in the rule patterns may be considered implicit wildcards and disregarded. Actions defined for matched rule patterns may be performed in the provider network. In this manner, an event stream may be searched for events that match rule patterns in an efficient manner.

Rule Evaluation in a Provider Network

Figure 1:
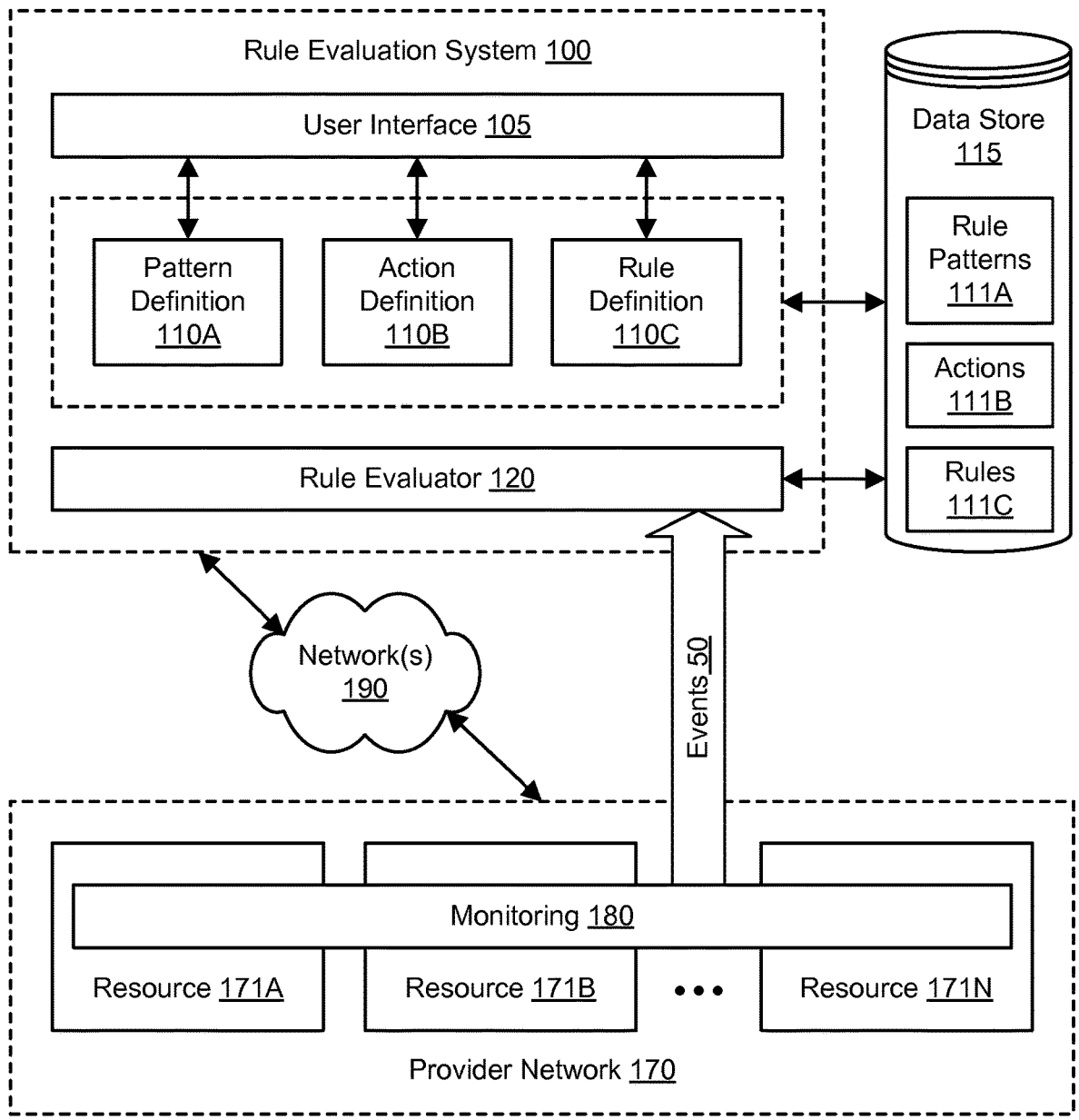
FIG. 1 illustrates an example system environment for rule evaluation in a provider network, according to some embodiments.

FIG. 1 illustrates an example system environment for rule evaluation in a provider network, according to some embodiments. A rule evaluation system 100 may include a plurality of components for evaluating rules and/or performing actions based on rules. In one embodiment, the rule evaluation system 100 may include a pattern definition functionality 110A, an action definition functionality 110B, and a rule definition functionality 110C. A data store 115 may store information associated with rule patterns 111A, actions 111B, and rules 111C defined using the pattern definition functionality 110A, action definition functionality 110B, and/or rule definition functionality 110C. The data store 115 may be implemented using any suitable storage technologies, such as database management technologies.

The rule evaluation system 100 may also include a user interface 105. In one embodiment, the user interface 105 may enable a user to define and/or select rule patterns 111A, actions 111B, and/or rules 111C using the pattern definition functionality 110A, action definition functionality 110B, and/or rule definition functionality 110C. For example, the user interface 105 may permit a user to select one or more predefined rule patterns and/or define one or more custom rule patterns. Similarly, the user interface 105 may permit a user to select one or more predefined actions and/or define one or more custom actions. The user interface 105 may permit a user to define one or more rules. In one embodiment, a rule may be defined to include one or more rule patterns and one or more actions. In one embodiment, a rule may be defined to include a rule pattern and a message exchange. Definitions of rule patterns 111A, actions 111B, and rules 111C are discussed in greater detail below with respect to FIG. 3.

Figure 8:
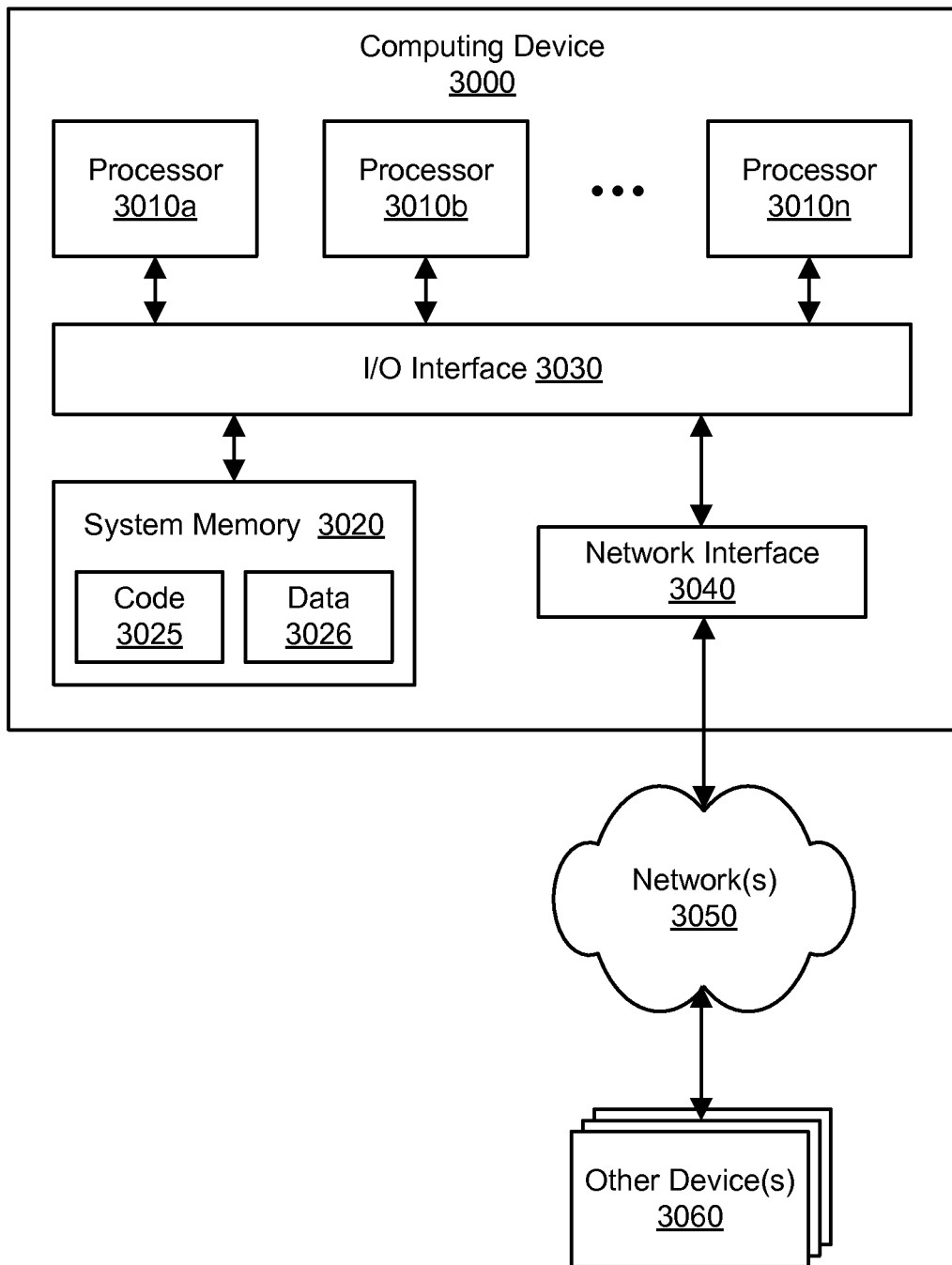
FIG. 8 illustrates an example of a computing device that may be used in some embodiments.

The rule evaluation system 100 may be implemented using one or more computing devices, any of which may be implemented by the example computing device 3000 illustrated in FIG. 8. In various embodiments, portions of the functionality of the rule evaluation system 100 may be provided by the same computing device or by any suitable number of different computing devices. If any of the components of the rule evaluation system 100 are implemented using different computing devices, then the components and their respective computing devices may be communicatively coupled, e.g., via a network. Each of the illustrated components may represent any combination of software and hardware usable to perform their respective functions. It is contemplated that the rule evaluation system 100 may include additional components not shown, fewer components than shown, or different combinations, configurations, or quantities of the components shown.

The rule evaluation system 100 may be coupled to a provider network 170 using one or more networks 190 or other interconnects. The provider network 170 may include a plurality of computing resources such as computing resources 171A and 171B through 171N. The resources 171A-171N may include any suitable number and configuration of compute instances and/or other processing resources, storage resources, database resources, network resources, power resources, and/or other suitable types of computing resources. Although three computing resources 171A, 171B, and 171N are shown for purposes of illustration, it is contemplated that any suitable number and configuration of computing resources may be used. The provider network 170 may include the sources of events 50 that can match rule patterns, the targets of actions, and/or one or more action handlers that perform actions.

The provider network 170 may be operated by an entity such as a company or a public sector organization to provide resources (such as resources 171A-171N) and/or services (such as various types of cloud-based computing or storage) to a distributed set of clients via the Internet and/or other networks. The provider network 170 may include numerous data centers hosting various resource pools, such as collections of physical and/or virtualized computer servers, storage devices, and networking equipment that are used to implement and distribute the infrastructure and services offered by the provider. The resources may, in some embodiments, be offered to clients in units called "instances," such as virtual or physical compute instances or storage instances. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the resources of the provider network 170 in different embodiments, including computer servers, storage devices, network devices, and the like.

In one embodiment, the provider network 170 may implement a flexible set of resource reservation, control, and access interfaces for clients. For example, the provider network 170 may implement a programmatic resource reservation interface (e.g., via a web site or a set of web pages) that allows clients to learn about, select, purchase access to, and/or reserve resources. In one embodiment, resources may be reserved on behalf of clients using a client-accessible service. In one embodiment, the provider network 170 may execute tasks on behalf of clients using one or more resources of a selected resource pool of the provider network. In one embodiment, the resource pool may be automatically selected based on the anticipated computational needs of the various tasks. In one embodiment, the resource pool may be selected based on a specific resource request or reservation submitted by the client.

The provider network 170 may also include a monitoring functionality 180. The monitoring functionality 180 may monitor any of the resources, e.g., during operation and/or use of the resources. The monitoring functionality 180 may use agent software or any other suitable techniques to monitor individual resources. In one embodiment, monitoring the resources in the provider network may include monitoring one or more service logs, monitoring one or more service metrics, and/or monitoring any suitable data streams. In one embodiment, the monitoring may compare performance metrics, usage metrics, and/or other suitable data relating to the operation of the resources 171A-171N to predetermined thresholds and/or alarms. Any suitable predetermined thresholds and/or alarms may represent one or more conditions for satisfying a particular rule pattern.

In one embodiment, the monitoring functionality 180 may generate events 50 that describe resources changes in the provider network 170, and the monitoring functionality may send the events to the rule evaluation system 100 to determine which of the events (if any) match the rule patterns 111A. In one embodiment, when the monitoring of the computing resources indicates that a particular type of state change has occurred in a resource, the monitoring functionality 180 may generate one or more of the events 50. The monitoring functionality 180 may generate at least some of the events 50 based on thresholds and/or alarms. For example, the monitoring functionality 180 may detect an alarm state change and may generate an event as a result. In one embodiment, external agents may implement the monitoring functionality 180 and generate the events 50. In one embodiment, services within the provider network 170 may implement the monitoring functionality 180 and generate the events 50.

In one embodiment, the rule evaluation system 100 may include a rule evaluator 120. The rule evaluator 120 may receive events 50 and determine which of the events match which of the rule patterns 111A. When a rule pattern is matched, the rule evaluator 120 may determine which rules 111C include the rule pattern. To determine which rules include the rule pattern, the rule evaluator 120 may refer to the stored rules 111C, rule patterns 111A, and/or other appropriate data in the data store 115. After retrieving any rules that include the matched rule pattern, the rule evaluator 120 may determine any actions defined in the retrieved rules. The rule evaluator 120 may then initiate any actions defined in the retrieved rules or otherwise cause the actions to be performed. When initiating actions, the rule evaluator 120 may supply various types of input, metadata, or parameters for the actions, e.g., as found in events that match rule patterns. In this manner, the rule evaluation system 100 may use defined rules to perform particular actions when particular rule patterns are matched activated.

Figure 2:
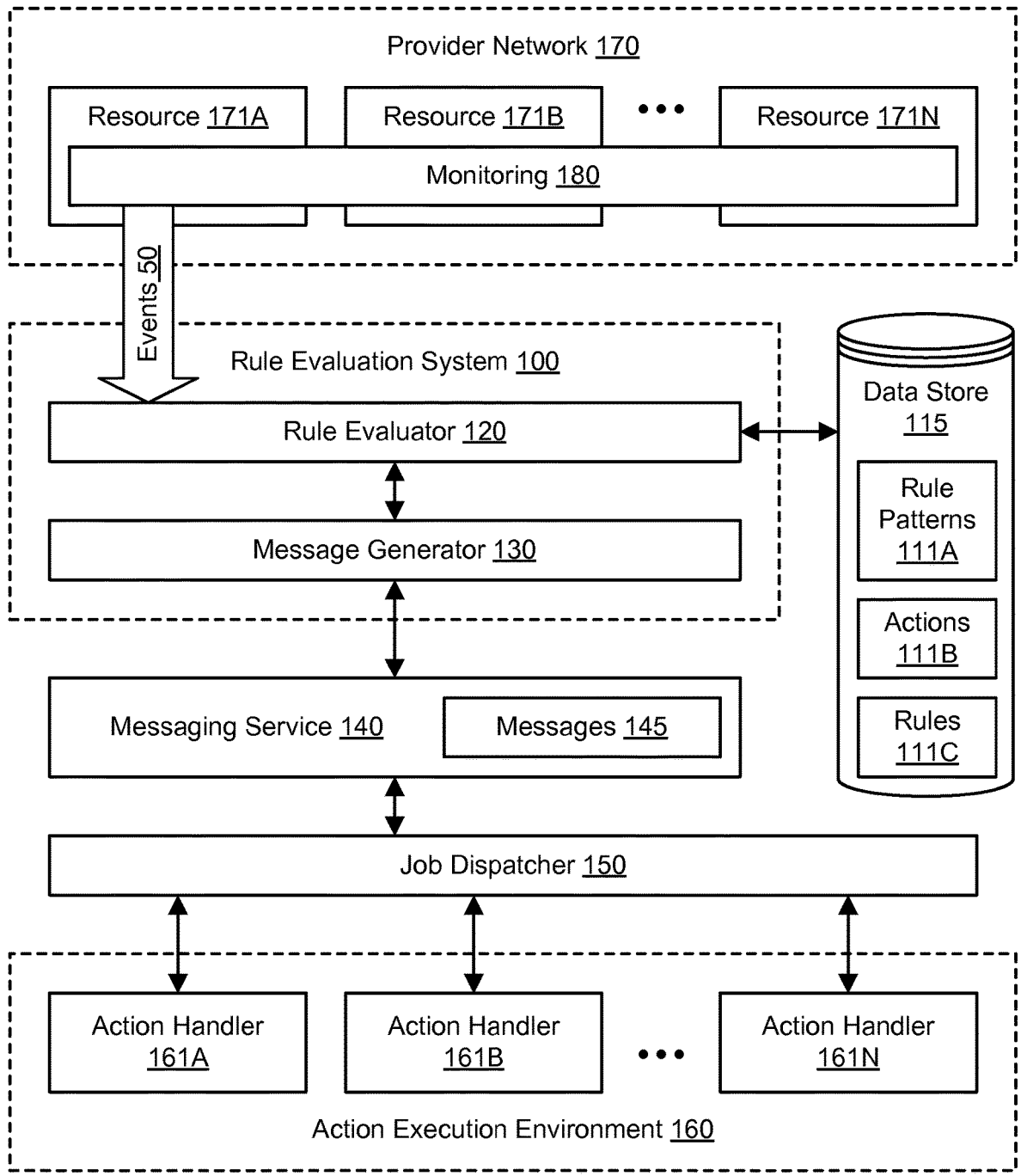
FIG. 2 illustrates further aspects of the example system environment for rule evaluation in a provider network, according to some embodiments.

FIG. 2 illustrates further aspects of the example system environment for rule evaluation in a provider network, according to some embodiments. The rule evaluation system 100 may include a message generator 130. When invoked by the rule evaluator 120, the message generator 130 may generate messages 145 that describe actions to be performed, e.g., when rule patterns associated with the actions are matched. The message generator 130 may send the messages 145 to a messaging service 140. The messages may be generated based on run-time input parameters supplied with any matched rule patterns and/or default parameters associated with actions. In one embodiment, a job dispatcher 150 may interact with the messaging service 140 to dispatch jobs based on the messages 145.

In one embodiment, an action execution environment 160 may perform the actions described in the messages 145 and dispatched by the job dispatcher 150. The action execution environment 160 may include one or more environments for executing instructions, including scripts, workflows, and/or compiled program code. The action execution environment 160 may include one or more action handlers, such as action handlers 161A and 161B through 161N. Although three action handlers 161A, 161B, and 161N are shown for purposes of illustration, it is contemplated that any suitable number of action handlers may be used. The actions performed by the action handlers 161A-161N may include any suitable modification and/or configuration of any of the resources 171A-171N and/or their constituent elements. For example, the actions may automatically terminate, suspend, or restart a compute instance in the provider network 170 when a particular rule pattern is matched. As another example, an action may be performed to automatically resize an image file to a predefined width and predefined height when the image file is added to a particular storage location, directory, or bucket. An action may be performed by an action handler based on a rule pattern being matched, based on a schedule, or based on a request from a user or other computing component.

In one embodiment, the rule evaluation system 100 may include a recommendation engine. The recommendation engine may use machine learning techniques to recommend automations to the customers based on customer resource usage patterns and/or resource metadata. The recommendation engine may also adapt to customer reaction and improve the recommendations over time. The recommendations may be improved using a feedback loop with input from customers and popular trends in the rule evaluation system 100.

In one embodiment, the messaging service 140 may be implemented using a queue service that manages one or more queues. Messages 145 describing actions to be performed may be sent to the messaging service or placed in the one or more queues. In one embodiment, one queue represent be a primary queue that initially stores all the messages generated by the message generator 130, and other queues may be used as backup queues if the primary queue is insufficient to handle all the messages. In one embodiment, the job dispatcher 150 may be implemented using a task poller. The task poller may poll the one or more queues at a suitable interval to determine whether the queues include messages, e.g., messages describing actions to be performed. The task poller may initiate the use of the backup queues upon receiving an appropriate error message from the primary queue. The task poller may poll each of the various queues at particular intervals. In one embodiment, the task poller may poll the primary queue more frequently than the backup queues.

Figure 3:
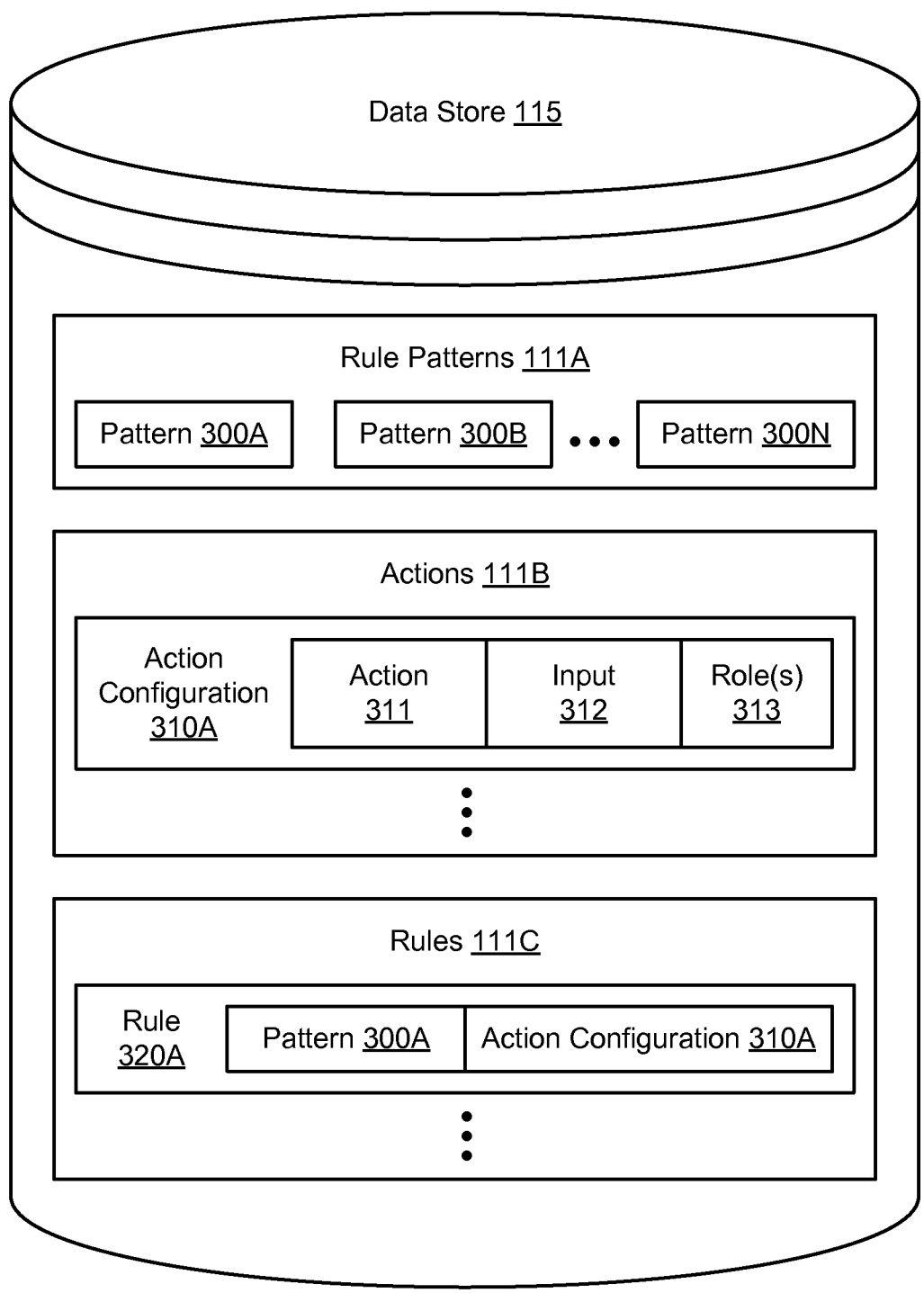
FIG. 3 illustrates further aspects of the example system environment for rule evaluation in a provider network, including a mapping of rule patterns to actions, according to some embodiments.

FIG. 3 illustrates further aspects of the example system environment rule evaluation in a provider network, including a mapping of rule patterns to actions, according to some embodiments. As discussed above, the data store 115 may store rule patterns 111A, actions 111B, and rules 111C. In the example shown in FIG. 3, the rule patterns 111A may include rule patterns 300A and 300B through 300N. However, it is contemplated that any suitable number of rule patterns may be stored in the data store 115.

In the example shown in FIG. 3, the actions 111B may include an action configuration 310A and one or more additional action configurations (not shown). Each action configuration (such as action configuration 310A) may include an action (such as action 311), any inputs for the action (such as input 312), and any roles (such as role(s) 313) needed for the action. An action may include one or more commands, instructions, or other invocations of functionality to perform one or more tasks. An action may be associated with inputs such as event-specific data to be supplied to the action. An action may be associated with inputs such as default parameters that apply to all invocations of the action. In one embodiment, run-time input parameters may also be specified for a particular instance of an action when the action is invoked. In one embodiment, the run-time input parameters may augment but not override the default parameters. For example, if an action involves resizing an image file when the image file is added, then the default parameters may include a target width and height, and the run-time input parameters may include the storage location of the image file. A role may include permissions or other security credentials that permit the action to have access to a set of resources at run-time. A role may be independent of any particular user or group of users and may represent a delegation of authority to the associated action.

In the example shown in FIG. 3, the rules 111C may include a rule 320A and one or more additional rules (not shown). The rule 320A may specify one of the rule patterns, such as rule pattern 300A, and one of the action configurations, such as action configuration 310A. When the rule pattern 300A is matched, the rule evaluator 120 may use the data store 115 to determine that the rule pattern 300A is part of rule 320A. The rule evaluator 120 may also use the data store 115 to determine that the action configuration 310A is also part of the rule 320A, e.g., is linked to the rule pattern 300A. The rule evaluator 120 may then cause the specified action 311 to be performed with the input 312 (and optionally run-time input parameters) and using the role(s) 313. In one embodiment, the message generator 130 may generate a message specifying the action 311, the input 312 (including, for example, any default parameters and/or run-time input parameters), and the role(s) 313.

In one embodiment, the rules 111C may include a mapping of rule patterns to actions. For example, a first rule may represent a binding of a rule pattern to a first action configuration, and a second rule may represent a binding of the same rule pattern to a second action configuration. When the rule pattern is matched, the rule evaluator 120 may use the data store 115 to determine that the rule pattern is part of both the first and second rules. The rule evaluator 120 may also use the data store 115 to determine that the first action configuration is part of the first rule and that the second action configuration is part of the second rule. The rule evaluator 120 may then cause the actions specified in both action configurations and to be performed. In one embodiment, the message generator 130 may generate one or more messages specifying the actions, the input associated with the actions, and any necessary role(s).

In one embodiment, the rules 111C may include a mapping of rule patterns to actions and/or a mapping of rule patterns to queue exchanges. For example, a first rule may represent a binding of a rule pattern to an action configuration. A second rule may represent a binding of the same rule pattern to a queue exchange. The queue exchange may specify one or more queue messages to be generated. When the rule pattern is matched, the rule evaluator 120 may use the data store 115 to determine that the rule pattern is part of the first and second rules. The rule evaluator 120 may also use the data store 115 to determine that the action configuration is part of the first rule and that the queue exchange is part of the second rule. The rule evaluator 120 may then cause the action specified in the action configuration to be performed. In one embodiment, the message generator 130 may generate one or more messages specifying the actions, the input associated with the actions, and any necessary role(s). Additionally, the rule evaluator 120 may generate a queue message as specified by the queue exchange and place that message in a queue or otherwise send the message to a messaging service. For example, the queue message may represent a notification (e.g., to an administrator or log) that the rule pattern was matched at a particular time or that the action in the action configuration was performed with particular parameters and at a particular time.

Event-Stream Searching Using Compiled Rule Patterns

Figure 4:
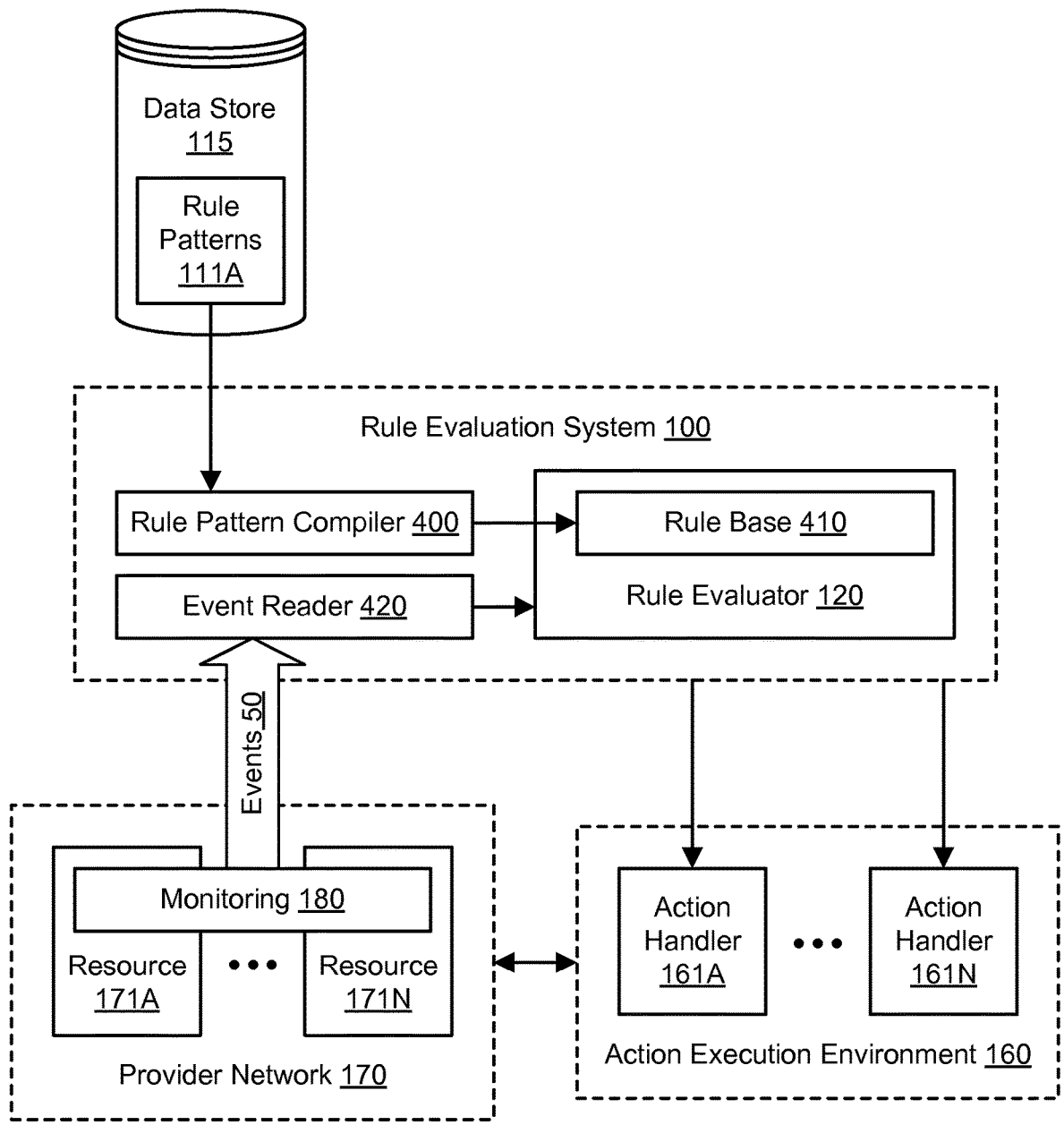
FIG. 4 illustrates an example system environment for event-stream searching using compiled rule patterns, according to some embodiments.

FIG. 4 illustrates an example system environment for event-stream searching using compiled rule patterns, according to some embodiments. In one embodiment, the monitoring functionality 180 may generate a plurality of events 50, and the rule evaluation system 100 may evaluate a compiled form of the rule patterns 111A against the events to determine which events (if any) match any of the rule patterns. The events may represent or indicate changes to resources (such as resources 171A-171N) in the provider network 170. The monitoring functionality 180 may monitor any of the resources, e.g., during operation and/or use of the resources, and it may detect resource changes using any suitable monitoring techniques. For example, the monitoring functionality 180 may use agent software or any other suitable techniques to monitor individual resources. In one embodiment, monitoring the resources in the provider network may include monitoring one or more service logs, monitoring one or more service metrics, and/or monitoring any suitable data streams. The monitoring functionality 180 may generate events 50, and each event may describe one or more changes to one or more resources. Examples of formats for events are discussed below with reference to FIG. 5.

The monitoring functionality 180 may use any suitable techniques to convey the events 50 to the rule evaluation system 100. In one embodiment, the monitoring functionality 180 may place the events 50 in an event bus. The event bus may be used to deliver a stream of events, such that different events are placed on the bus and/or ready for delivery at different times. The rule evaluation system 100 may comprise an event reader 420 that receives events, such as by reading the events from the event bus or other stream. In one embodiment, clients of the provider network 170 may also supply events to the event reader 420, e.g., by placing the events in an event bus or other stream. In one embodiment, a single event bus or stream or multiple event buses or streams may be used to deliver events 50 to the rule evaluation system 100 for evaluation of potential matches with rule patterns. For example, the event bus may be divided into a plurality of shards, and each shard may be associated with one or more event readers.

As discussed above with respect to FIG. 3, a rule may be defined to include one or more rule patterns and one or more actions and/or message exchanges. A rule pattern may represent one or more conditions that, when satisfied, may cause the rule evaluation system 100 to invoke any actions associated with any corresponding rules. The events 50 may describe conditions in the provider network 170, and the rule evaluation system 100 may evaluate a compiled form of the rule patterns 111A against the events to determine which events (if any) describe conditions corresponding to any of the rule patterns 111A. Accordingly, the rule evaluation system 100 may evaluate a compiled form of the rule patterns 111A against the events to determine which events (if any) match the rule patterns 111A.

The rule evaluation system 100 may include a rule compiler 400. Using the rule compiler 400, the rule evaluation system 100 may compile or otherwise generate a rule base 410 based (at least in part) on the rule patterns 111A. As used herein, the term compilation generally includes the transformation of rules or portions thereof (such as rule patterns that describe conditions) into another format. The compiled rule base 410 may include any suitable program instructions and/or data to capture or otherwise describe a set of one or more rule patterns in a manner that permits efficient evaluation of the rule patterns against events. In one embodiment, the rule base 410 may capture the set of rule patterns defined by or for a particular client of the provider network 170 rather than all the rule patterns in the data store 115. The rule base 410 may also be referred to as a machine object.

In one embodiment, the rule base 410 may represent a finite-state machine. The finite-state machine may represent a directed graph in which nodes represent finite states and edges represent transitions between those states. The finite-state machine may be in only one of the finite states at any particular time, and the finite-state machine may transition between these states when conditions in events match conditions in rule patterns. An example of such a finite-state machine is discussed below with respect to FIG. 6.

In one embodiment, the rule evaluation system 100 may include the rule evaluator 120. Using the rule evaluator 120, the rule evaluation system 100 may evaluate the rule base 410 against the events 50 to determine which events (if any) match any of the rule patterns captured in the rule base. As used herein, the matching of an event to a rule pattern (or vice versa) generally indicates that conditions described in an event satisfy the conditions associated with one or more rule patterns. Accordingly, it may be said that the rule base 410 represents or captures the rule patterns associated with one or more rules, and the rule evaluator 120 may evaluate the rule base against the events to determine which events (if any) match any of the rule patterns in the rule base. In one embodiment, the events 50 used as input to the rule evaluator 120 may represent events for resources owned by a particular client of the provider network 170, e.g., the same client whose rule patterns are compiled into the rule base 410. Accordingly, aspects of the rule evaluation system 100, such as the rule evaluator 120 and/or event reader 420, may be implemented on a per-client basis.

When an event matches a rule pattern, the rule evaluation system 100 may invoke or cause to be performed any actions specified in any rules that include the rule pattern. In one embodiment, the rule evaluation system 100 may send suitable information (including all or part of an event matching a rule pattern as well as other parameters for any related actions) to one or more action handlers, such as action handlers 161A-161N, in an action execution environment 160. The actions performed by the action handlers 161A-161N may include any suitable modification and/or configuration of any of the resources 171A-171N and/or their constituent elements. In one embodiment, the rule evaluator may modify an event that matches a rule pattern and then store and/or forward the modified event.

The rule evaluation system 100 may be implemented using one or more computing devices, any of which may be implemented by the example computing device 3000 illustrated in FIG. 8. In various embodiments, portions of the functionality of the rule evaluation system 100 may be provided by the same computing device or by any suitable number of different computing devices. If any of the components of the rule evaluation system 100 are implemented using different computing devices, then the components and their respective computing devices may be communicatively coupled, e.g., via a network. Each of the illustrated components may represent any combination of software and hardware usable to perform their respective functions. It is contemplated that the rule evaluation system 100 may include additional components not shown, fewer components than shown, or different combinations, configurations, or quantities of the components shown.

Figure 5:
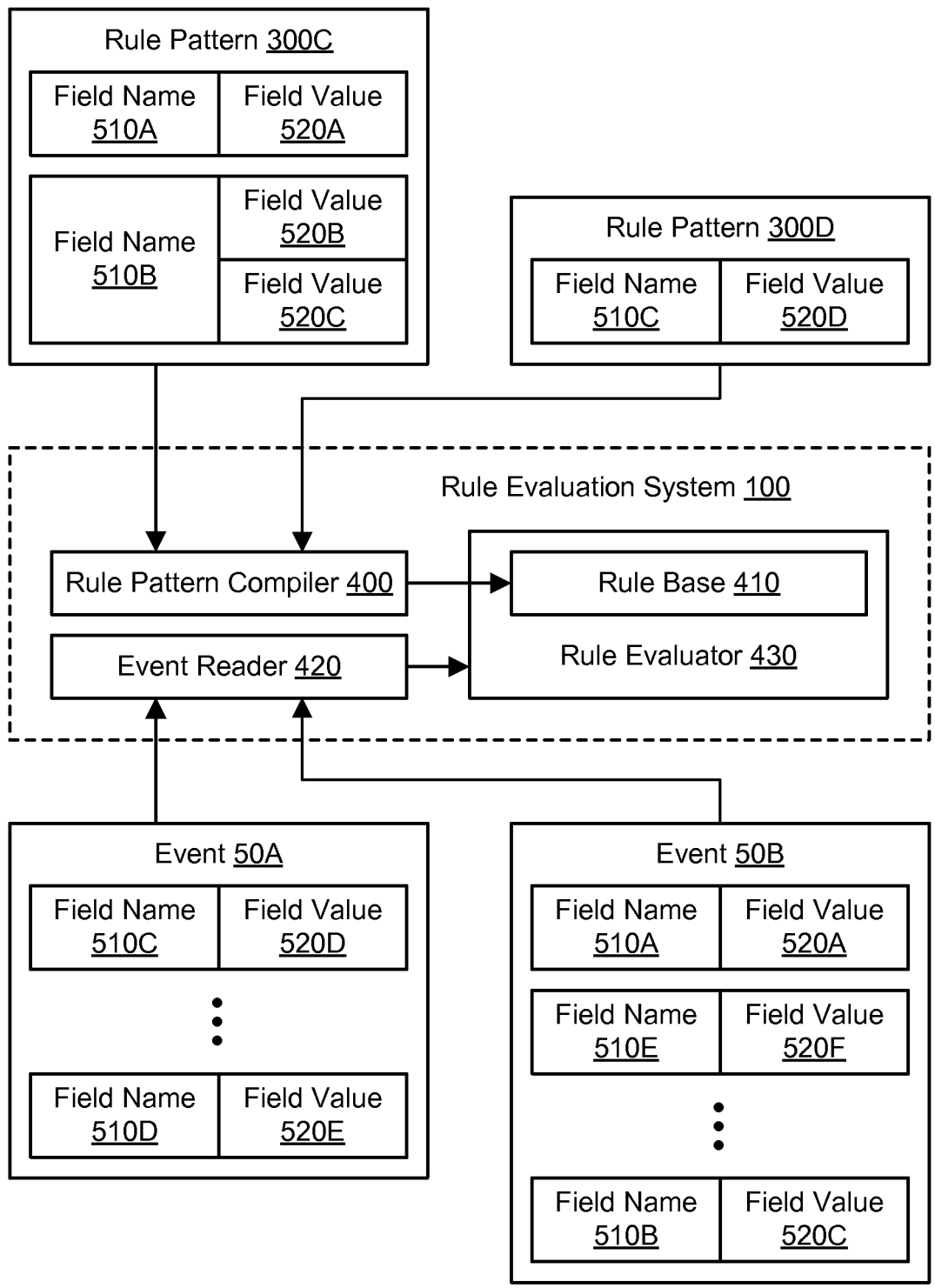
FIG. 5 illustrates further aspects of the example system environment for event-stream searching using compiled rule patterns, including examples of events that match particular rule patterns, according to some embodiments.

FIG. 5 illustrates further aspects of the example system environment for event-stream searching using compiled rule patterns, including examples of events that match particular rule patterns, according to some embodiments. Rule patterns 300C and 300D represent examples of rule patterns that may be compiled into the rule base 410. Each rule pattern may include one or more field names. For each field name, the rule pattern may include one or more field values. For example, rule pattern 300C may include a first field name 510A and an associated field value 520A. Rule pattern 300C may also include a second field name 510B and two associated field values 520B and 520C. Field names and their associated values may generally describe characteristics or attributes of resources in the provider network 170. In some cases, a field name may include a nested or otherwise hierarchical structure that may be flattened during compilation of the rule patterns. The rule evaluation system 100 may evaluate potential matches based on arbitrary or user-defined Boolean combinations of field names and/or field values. For example, in one embodiment, for the rule pattern 300C to be matched by an event, all of the field names 510A and 510B should be present in the event; however, any one of the field values for a field name (e.g., either value 520B or value 520C for name 510B) may satisfy the conditions represented by the rule pattern. As another example, rule pattern 300D may include a field name 510C and an associated field value 520D. In one embodiment, for the rule pattern 300D to be matched by an event, the field name 510C and associated field value 520D should be present in the event.

Events 50A and 50B represent examples of events that may be used as input into the rule evaluation 430. Each event may include one or more field names. For each field name, the event may include one or more field values. For example, event 50A may include a field name 510C and associated field value 520D as well as a field name 510D and associated field value 520E. Field names and their associated values in events 50 may generally describe characteristics or attributes of resources in the provider network 170. In some cases, a field name in an event may include a nested or otherwise hierarchical structure that may be flattened prior to rule evaluation against the event. The event 50A may also include other field names (not shown), as indicated by the ellipsis. As another example, event 50B may include a field name 510A and associated field value 520A, a field name 510E and associated field value 520F, and a field name 510B and associated field value 520C. The event 50B may also include other field names (not shown), as indicated by the ellipsis.

In one embodiment, the events 50A and 50B may be represented initially using a structured, hierarchical format such as JSON or XML. In such a format, the events 50A and 50B may include nested structures such that some field names may be represented by different name components across different levels of the hierarchy. Prior to evaluating such events, the rule evaluation system 100 may flatten the events and sort the field names within the events. For example, flattening the event 50A or 50B may include extracting the field names (with their associated values) from a hierarchy or other structured format in the event and placing them in a flattened event. The field names within a flattened event may then be sorted and reordered using any suitable basis (e.g., alphabetically) to generate a flattened and sorted event.

Rule patterns 111A may also be represented initially using a structured, hierarchical format such as JSON or XML. Accordingly, the rule patterns 300C and 300D may also be flattened and have their field names sorted on the same basis as the events. For example, rule pattern 300C may initially be defined as follows:

```
{
    "detail-type": [ "ec2/spot-bid-matched" ],
    "detail" : {
        "state": [ "in-service", "stopped" ]
    }
}
```

In one embodiment, the initial definition of rule pattern 300C may be flattened to produce the following rule, where "detail-type" represents field name 510A, "ec2/spot-bid-matched" represents field value 520A, "detail.state" represents field name 510B, and "in-service" and "stopped" represent field values 520B and 520C:

```
"detail-type", "ec2/spot-bid-matched",
"detail.state" , "in-service",
"detail.state", "stopped"
```

As another example, rule pattern may initially be defined as follows:

```
{
    "detail" : {
        "state": [ "pending" ]
    }
}
```

In one embodiment, the initial definition of rule pattern 300D may be flattened to produce the following rule, where "detail.state" represents field name 510C and "pending" represents field value 520D:

"detail.state", "pending"

In one embodiment, the rule evaluation 430 may examine each event only for field names matching one or more rule patterns and may disregard other field names present in the event. For example, when the event 50A is received, the rule evaluation 430 may evaluate the rule patterns 300C and 300D against the event using the rule base 410. The event 50A may match the rule pattern 300D because the event includes the field name 510C and associated field value 520D described in the rule pattern. In one embodiment, once the name 510C and value 520D are found in the event 50A, the rule evaluation 430 may determine that the rule pattern 300D has been matched by the event. The rule evaluation 430 may determine that the rule pattern 300C is not matched by the event 50A once the names 510A and 510B are not found in the event. If the rule base captures only the rules 300C and 300D, then the rule evaluation 430 may examine the event 50A only for field names 510A, 510B, and 510C and disregard other field names in the event (such as name 510D).

As another example, when the event 50B is received, the rule evaluation 430 may evaluate the rules 300C and 300D against the event using the rule base 410. The event 50B may match the rule pattern 300C because the event includes the field name 510A and associated field value 520A described in the rule pattern as well as the field name 510B and one of the associated field values 520C described in the rule pattern. In one embodiment, once the names 510A and 510B and associated values are found in the event 50B, the rule evaluation 430 may determine that the rule pattern 300C has been matched by the event. The rule evaluation 430 may determine that the rule pattern 300D is not matched by the event 50B once the name 510C is not found in the event. If the rule base captures only the rule patterns 300C and 300D, then the rule evaluation 430 may examine the event 50B only for field names 510A, 510B, and 510C and disregard other field names in the event (such as name 510E).

Field names and field values may be defined arbitrarily by users and/or resources; the rule evaluation system 100 may operate without reference to any schemas for rule patterns and events. The internal sorting of the rule patterns and events by field name may permit an efficient evaluation of the rule base 410 against the events. In one embodiment, the evaluation may be implemented such that performance of the evaluation may not vary substantially based on differences in the number of rule patterns (e.g., the evaluation may be an O(1) operation in terms of the number of rule patterns). In one embodiment, the evaluation may be able to process hundreds of thousands of events per second.

Figure 6:
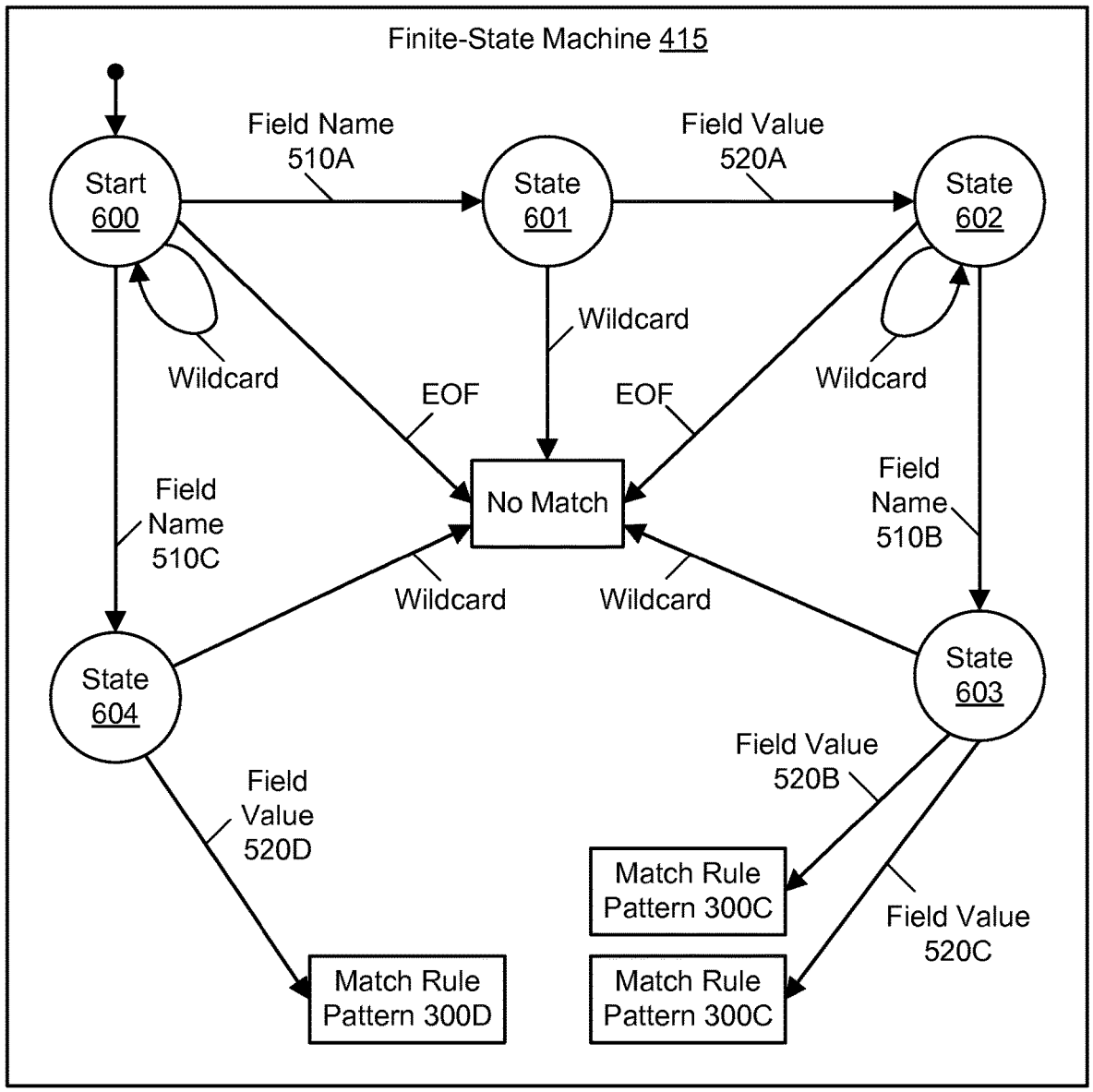
FIG. 6 illustrates an example of a finite-state machine usable for event-stream searching using compiled rule patterns, according to some embodiments.

FIG. 6 illustrates an example of a finite-state machine usable for event-stream searching using compiled rule patterns, according to some embodiments. As discussed above, the rule base 410 may represent a finite-state machine 415. The finite-state machine 415 may represent a directed graph in which nodes represent finite states and edges represent transitions between those states. The finite-state machine 415 may be in only one of the finite states at any particular time, and the finite-state machine may transition between these states when conditions in events match conditions in rule patterns. The example of the finite-state machine 415 may include states such as initial state 600 (also referred to as a start state) and subsequent or additional states 601, 602, 603, and 604. Each of the states 600-604 may be implemented using a hash table for efficient matching of tokens. The finite-state machine 415 may be compiled based on the rules 300C and 300D.

When evaluation of the rule patterns against a particular event is initiated, the finite-state machine 415 may begin in the initial state 600. While the finite-state machine 415 is in the initial state 600, the evaluation may proceed through the sorted field names in the event until the name 510A or name 510C is encountered or until the end of file (EOF) is encountered in the event. If EOF is encountered in state 600, then the evaluation may determine that the event does not match any of the rule patterns 300C or 300D, and the finite-state machine 415 may be exited. Any field name other than names 510A and 510C may represent an implicit wildcard, and the finite-state machine 415 may stay in the initial state 600 if such a field name is encountered in the event. If the field name 510A is matched in the event while in state 600, then the match may cause a transition from state 600 to state 601. In state 601, if any field value other than value 520A is encountered, then the evaluation may determine that the event does not match the rule pattern 300C. If the field value 520A is matched in the event while in state 601, then the match may cause a transition from state 601 to state 602.

While the finite-state machine 415 is in the state 602, the evaluation may proceed through the sorted field names in the event until the name 510B is encountered or until the end of file (EOF) is encountered in the event. If EOF is encountered in state 602, then the evaluation may determine that the event does not match the rule pattern 300C. Any field name other than name 510B may represent an implicit wildcard, and the finite-state machine 415 may stay in the state 602 if such a field name is encountered in the event. If the field name 510B is matched in the event, then the match may cause a transition from state 602 to state 603. In state 603, if any field value other than value 520B or 520C is encountered, then the evaluation may determine that the event does not match the rule pattern 300C. If the field value 520B or 520C is matched in the event while in state 603, then the evaluation may determine that the event matches the rule pattern 300C.

If the field name 510C is found in the event while in state 600, then the match may cause a transition from state 600 to state 604. In state 604, if any field value other than value 520D is encountered, then the evaluation may determine that the event does not match the rule pattern 300D. If the field value 520D is matched in the event while in state 604, then the evaluation may determine that the event matches the rule pattern 300D.

Figure 7:
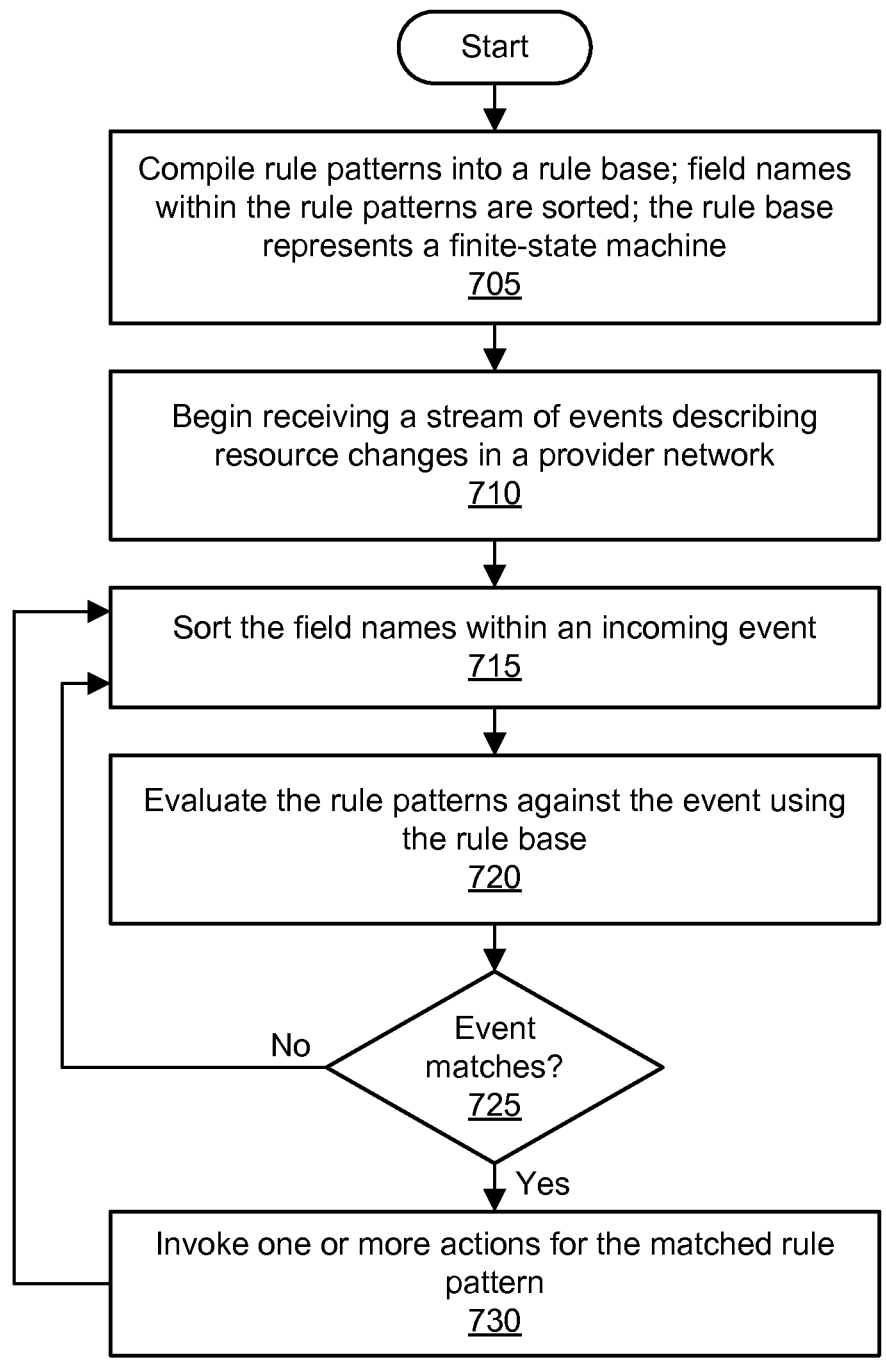
FIG. 7 is a flowchart illustrating a method for event-stream searching using compiled rule patterns, according to some embodiments.

FIG. 7 is a flowchart illustrating a method for event-stream searching using compiled rule patterns, according to some embodiments. As shown in 705, a set of one or more rule patterns may be compiled into a rule base. Each pattern includes one or more field names and one or more field values for each of the field name(s). The field names within a rule pattern may be sorted (e.g., alphabetically) during the compilation process. In one embodiment, field names may be flattened to eliminate a hierarchical structure in addition to being sorted. The rule base may represent a finite-state machine that includes a plurality of states. Transitions between the states may correspond to matches of field names and/or matches of field values.

As shown in 710, a stream of events may begin to be received. The events may describe resource changes in a provider network. The events may include field names and field values for the field names that describe characteristics or attributes of changed resources. The field names within an event may be sorted (e.g., alphabetically) upon receipt. In one embodiment, field names in events may be flattened to eliminate a hierarchical structure in addition to being sorted.

After being internally sorted by field name, each event in the stream may be analyzed as shown in 720 and 725. As shown in 720, the rule patterns may be evaluated against the events using the rule base. In one embodiment, the evaluation may determine that a particular event does not match a particular rule pattern if the field names in the particular rule pattern are not found in the particular event. The evaluation may be based on arbitrary or user-defined Boolean combinations of field names and/or field values. For example, in one embodiment, a match of a particular event to a particular rule pattern may be determined if all the field names in the particular rule pattern are found in the particular event and if any field values for the field names in the particular rule pattern are found in the particular event. Field names in events that do not match field names in rules may be considered implicit wildcards and may be disregarded. In one embodiment, field names that represent wildcards may cause the finite-state machine to remain in a current state.

As shown in 725, the evaluation may determine if a rule pattern is matched by an event. In determining a matched rule pattern, the finite-state machine may transition between at least two of the states. For example, the finite-state machine may transition between a first state and a second state when a field name from a rule pattern is found in an event, and the finite-state machine may transition between the second state and a third state when a satisfactory field value for the field name is found in the event. If a rule is not matched, then the sorting and evaluation may proceed for additional events, as shown in 715. If a matched rule pattern is found, then as shown in 730, one or more actions for the matched rule pattern (e.g., as specified in one or more rules) may be invoked or performed. For example, the actions may be performed in the provider network, e.g., to modify or configure one or more resources. Actions may also be performed (e.g., by the rule evaluation system) to modify events themselves when those events are determined to match particular rule patterns.

Illustrative Computer System

In at least some embodiments, a computer system that implements a portion or all of one or more of the technologies described herein may include a computer system that includes or is configured to access one or more computer-readable media. FIG. 8 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 8 may be used to implement the described functionality in various embodiments; for example, software components running on a variety of different devices and servers may collaborate to provide the functionality. In some embodiments, portions of the described functionality may be implemented using storage devices, network devices, or a variety of different computer systems. The term "computing device," as used herein, refers to at least all these types of devices, and is not limited to these types of devices.

Various embodiments may further include receiving, sending, or storing instructions and/or data implemented in accordance with the foregoing description upon a computer-readable medium. Generally speaking, a computer-readable medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc. In some embodiments, a computer-readable medium may also include transmission media or signals such as electrical, electromagnetic, or digital signals, conveyed via a communication medium such as network and/or a wireless link.

The various methods as illustrated in the Figures and described herein represent examples of embodiments of methods. The methods may be implemented in software, hardware, or a combination thereof. In various of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
a plurality of computing devices configured to implement a rule evaluation system and a provider network comprising a plurality of resources, wherein the rule evaluation system is configured to:
compile a plurality of rule patterns into a rule base, wherein the rule patterns comprise one or more field names and one or more field values, wherein, in compiling the rule patterns into the rule base, the field names within the rule patterns are sorted, wherein the rule base represents a finite-state machine comprising a plurality of states, and wherein transitions between the states represent matches of field names and matches of field values;
begin receiving a stream of events, wherein the events comprise field names and field values describing resource changes to the plurality of resources in the provider network;
sort the field names within the events received in the stream of events;
evaluate the rule patterns comprising the sorted field names within the rule patterns against the stream of events comprising the sorted field names within the events, using the rule base to determine a matched rule pattern, wherein, in determining a matched rule pattern, the finite-state machine transitions from an initial state to an additional state based at least in part on a matched field name or a matched field value; and
invoke one or more actions for the matched rule pattern, wherein the one or more actions are performed by one or more action handlers, and wherein the one or more actions comprise a modification or configuration of either at least one of the plurality of resources or one or more constituent elements of the plurality of resources.

2. The system as recited in claim 1, wherein, in evaluating the rule patterns against the stream of events, the rule evaluation system is configured to:
disregard field names in events that do not match field names in rule patterns.

3. The system as recited in claim 1, wherein, in evaluating the rule patterns against the stream of events, the rule evaluation system is configured to:
determine a match of a particular event to a particular rule pattern if field names in the particular rule pattern are found in the particular event or if field values for the field names in the particular rule pattern are found in the particular event.

4. The system as recited in claim 1, wherein the rule evaluation system is further configured to:
flatten an event to generate a flattened event prior to sorting field names within the flattened event, wherein the flattened event eliminates a hierarchical structure of one or more field names.

5. A computer-implemented method, comprising:
generating a rule base based at least in part on one or more rule patterns, wherein the rule patterns comprise one or more field names and one or more field values, wherein the field names within the rule patterns are sorted, and wherein the rule base represents a finite-state machine comprising a plurality of states;
receiving a plurality of events, wherein the events comprise field names and field values describing events associated with resources in a provider network;
sorting the field names within the events of the received plurality of events;
evaluating, using the rule base, the rule patterns comprising the sorted field names within the rule patterns against the events comprising the sorted field names within the events, to determine a matched rule pattern, wherein the finite-state machine transitions between at least two of the states in determining a matched rule pattern; and causing one or more actions for the matched rule pattern to be performed by one or more action handlers, wherein the one or more actions comprise a modification or configuration of either at least one of the resources in the provider network or one or more constituent elements of the resources.

6. The method as recited in claim 5, wherein evaluating the rule patterns against the events using the rule base comprises:

disregarding field names in events that do not match field names in rule patterns.

7. The method as recited in claim 5, wherein evaluating the rule patterns against the events using the rule base comprises:

determining a match of a particular event to a particular rule pattern if field names in the particular rule are found in the particular event or if field values for the field names in the particular rule pattern are found in the particular event.

8. The method as recited in claim 5, wherein evaluating the rule patterns against the events using the rule base comprises:

determining a match of a particular event to a particular rule pattern if the particular event matches a Boolean combination of field names or field values in the particular rule pattern.

9. The method as recited in claim 5, further comprising:

flattening an event to generate a flattened event prior to sorting field names within the flattened event, wherein the flattened event eliminates a hierarchical structure of one or more field names.

10. The method as recited in claim 5, wherein the rule patterns are specified for a client of the provider network, and wherein the events are associated with resources belonging to the client.

11. The method as recited in claim 5, wherein transitions between the states represent matches of field values.

12. A non-transitory computer-readable storage medium storing program instructions computer-executable to perform:

compiling a rule base based at least in part on one or more rule patterns, wherein the rule patterns comprise information including one or more field names and one or more field values, wherein the field names within the rule patterns are sorted, and wherein the rule base represents a finite-state machine comprising a plurality of states;

receiving a plurality of events in a stream, wherein the events comprise information including field names and field values describing events associated with resources;

sorting the information within the events of the plurality of events received in the stream;

evaluating, using the rule base, the rule patterns comprising the sorted field names within the rule patterns against the events comprising the sorted information within the events, to determine a matched rule pattern, wherein the finite-state machine transitions between at least two of the states in determining a matched rule pattern; and causing one or more actions for the matched rule pattern to be performed by one or more action handlers, wherein the one or more actions comprise a modification or configuration of either at least one of the resources or one or more constituent elements of the resources.

13. The non-transitory computer-readable storage medium as recited in claim 12, wherein evaluating the rule patterns against the events using the rule base comprises:

disregarding field names in events that do not match field names in rule patterns.

14. The non-transitory computer-readable storage medium as recited in claim 12, wherein evaluating the rule patterns against the events using the rule base comprises:

determining a match of a particular event to a particular rule pattern if field names in the particular rule are found in the particular event or if field values for the field names in the particular rule pattern are found in the particular event.

15. The non-transitory computer-readable storage medium as recited in claim 12, wherein evaluating the rule patterns against the events using the rule base comprises:

determining a match of a particular event to a particular rule pattern if the particular event matches a Boolean combination of field names or field values in the particular rule pattern.

16. The non-transitory computer-readable storage medium as recited in claim 12, wherein the program instructions are further computer-executable to perform:

flattening an event to generate a flattened event prior to sorting field names within the flattened event, wherein the flattened event eliminates a hierarchical structure of one or more field names.

17. The non-transitory computer-readable storage medium as recited in claim 12, wherein the program instructions are further computer-executable to perform:

modifying an event that matches a rule pattern.

18. The non-transitory computer-readable storage medium as recited in claim 12, wherein the rule patterns are specified for a client of a provider network, and wherein the events are associated with resources belonging to the client.

19. The non-transitory computer-readable storage medium as recited in claim 12, wherein transitions between the states represent matches of field names and matches of field values.

* * * * *